March 14, 1967 R. FAVRE 3,309,592
ELECTRONIC SWITCHING SYSTEM FOR MOTORS
Filed Jan. 28, 1964 4 Sheets-Sheet 1

3,309,592
ELECTRONIC SWITCHING SYSTEM FOR MOTORS
Robert Favre, Lausanne, Switzerland, assignor to Golay, Buchel & Cie. S.A., Malley-Lausanne (Canton of Vaud), Switzerland, a firm
Filed Jan. 28, 1964, Ser. No. 340,630
Claims priority, application Switzerland, Jan. 31, 1963, 1,226/63
11 Claims. (Cl. 318—138)

Motors provided with electronic commutating means are already known, which have in their simplest embodiment a two-pole diametrically magnetized rotor, together with a two-pole one-phase stator. The periodic energizing of the stator winding can be unipolar, in other words, the driving torque can operate only during one half cycle, or else it may be bipolar, which means that the driving torque is exerted during both half cycles. The periodic energizing or commutation of the stator winding is advantageously controlled by a member rigidly connected with the rotor and which acts at the desired moment on a suitable detector of the type described in the U.S. application Ser. No. 243,893, filed December 11, 1962, now Patent No. 3,240,404.

Such a motor reaches its normal running conditions when the voltage induced by the rotation of the rotor is substantially equal to the applied voltage. In order to adjust the speed of revolution of such a motor, it was necessary hitherto to modify the applied voltage. Furthermore, a problem arises in the case of such motors which operate generally with semi-conductive elements, the problem consists in the protection of the semi-conductive elements, chiefly power transistors against too large intensities and voltages. In particular, when starting such motors, excess intensities should be avoided and it is also necessary to provide suitable means for limiting the induced voltage peaks appearing during the commutation, that is when cutting out a winding on the stator, to values which are not detrimental to the semi-conductive elements. The same problem arises in case of electric braking of such motors.

To solve the problem, the invention provides a switching system for motors provided with electronic commutation means characterized by the fact that during the energization phase, the element controlling the commutation of the phase is cut off periodically under the control of an opening characteristic defining the operation of the motor while the inductive energy stored in the motor energizing winding during a conductive period is at least partly recovered during the following blocking period.

The invention resorts to a type of cutting out of phases, according to which one half wave of the A.C. feed voltage is not cut off in the usual manner for a predetermined phase angle, and in contradistinction the arrangement is such that during an energizing phase, the D.C. voltage applied to the motor winding is periodically cut off in a predetermined periodic manner independently of the energizing of the energizing phase.

The invention will be readily understood from inspection of the accompanying drawings illustrating four examples of wiring diagrams selected by way of examples. In the drawings, FIG. 1, is a first embodiment of a wiring diagram according to the invention.

Figure 1:
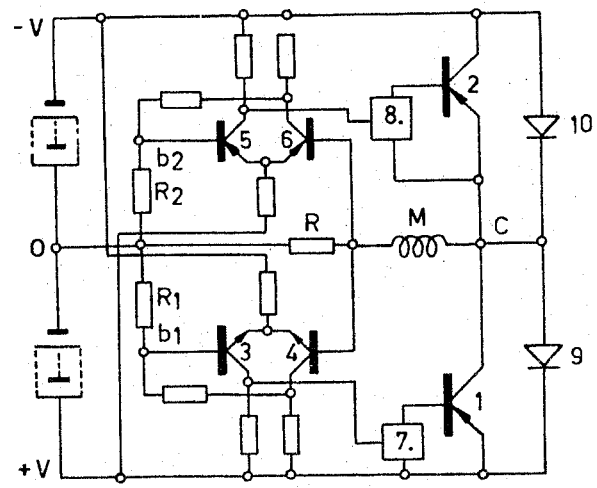

Turning to FIG. 1, the driving winding M of a motor which is not otherwise illustrated and which is provided with electronic commutation means, is connected on the one hand through the resistance R with the common terminal O of two sources of energy and, on the other hand, respectively through the collector and emitter of a power transistor 1 and through the emitter and collector of transistor 2 with the terminals $+V$ and $-V$ of the said sources of energy. The emitter and collector circuit of each of the power transistors is inserted in anti-parallel relationship with a diode, 9 or 10 according to the case. The transistors 1 and 2 control the switching of the current in the driving winding M and are controlled in their turn by the corresponding detectors 7 and 8. Each of the detectors is inserted in the base circuit of the corresponding transistor and is energized by the position of the rotor of the motor through a member rigidly connected with the rotor and constituted for instance by a screening disc provided with a notch, so as to energize the transistor 7 or 8 by any known means in a periodic manner.

The voltage across the resistance R determines the current in the winding. When the voltage reaches a predetermined limit value, it provides for the reversal of a suitable monostable multivibrator for instance of a so-called Schmidt trigger $b1$ or $b2$ consisting of the positive half wave or cycle by the transistors 3 and 4 and for the negative half wave or cycle by the transistors 5 and 6.

In the presence for instance of a negative half cycle, the transistor 6 of the monostable multivibrator stage $b2$ is cut off while the transistor 5 is conductive as long as the voltage across the resistance R has not risen above a predetermined threshold value. For the inoperative condition, the base of the transistor 6 assumes approximately a potential zero whereas the base of the transistor 5 assumes, across the resistance R2 a corresponding negative preliminary voltage. When a value above threshold voltage across the resistance R is reached, the transistor 6 is shifted into a conductive condition while simultaneously the transistor 5 is locked in a conventional manner. The return into the first operative condition for the monostable multivibrator stage $b2$ is obtained when the voltage across the resistance A, drops underneath a predetermined value lying slightly underneath the first-mentioned threshold voltage. The difference between the two voltages defining the monostable multivibrator stage $b2$ depends on the characteristic data of the circuit.

Figure 2:
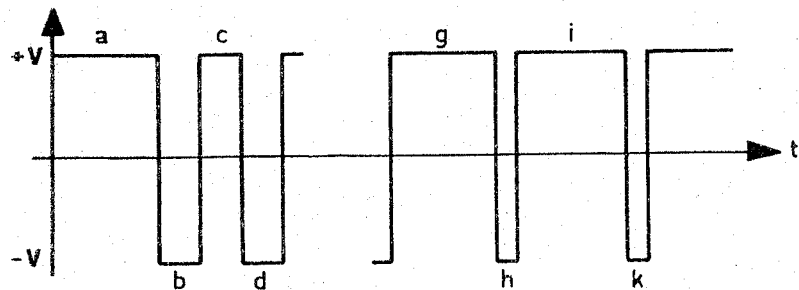
FIG. 2, is a graph illustrating examples of the voltage curve at the point C of the wiring diagram according to FIG. 1.

The switching of the current in the winding by the power transistors 1 and 2 is obtained as follows:

Assuming that, upon energizing of the motor, the rotor assumes a position such that the power transistor 1 is set into its conductive condition, the winding M will therefore be fed with a positive half cycle. At such a moment, there is obtained at the point C in FIG. 1 a voltage corresponding to the point designated by "$a$" in FIG. 2, whereas in the case of FIG. 3 the current corresponding to the rectilinear section designated by $a$ rises approximately linearly by reason of the induction in the winding. When the current reaches the value designated by I2 in FIG. 3, which value corresponds to the first-mentioned threshold voltage across the resistance R, the monostable multivibrator stage $b1$ is shifted back into its other operative condition, which results in a locking of the detector 7 against conductivity and consequently in a locking of the power transistor 1. This being obtained, the current decreases in accordance with the section $b$ illustrated in FIG. 3. At the same time, the self induced voltage is reversed and reaches (since the diode 10 operates as a voltage limiting diode and prevents any rising of the voltage above the value of the voltage at the terminal of the supply of energy) the voltage level —V designated by b in FIG. 2. When the curernt sinks below the value designated by I1 in FIG. 3, which value corresponds to the second-mentioned threshold value across the resistance R, the monostable multivibrator stage b1 returns to its original condition and consequently the detector 7 and therewith the power transistor 1 are again operative. This being done, the periodical energizing and deenergizing of the power transistor 1 continues periodically until, as a consequence of the continued rotation of the motor rotor, the detector 7 is locked by the above-mentioned control member carried by the rotor and at this moment the detector 8 is responsive so that henceforward the driving winding M is energized by the negative half-cycle through the agency of the transistor 2 in a manner fully similar to what has been described hereinabove.

Figure 3:
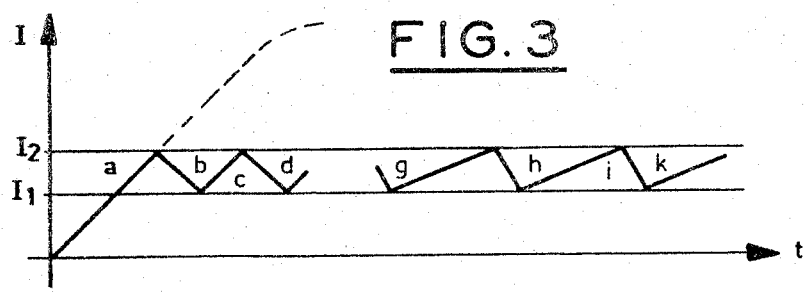
FIG. 3, is a graph illustrating the corresponding curve of the intensity in the driving winding M shown in FIG. 1.

The described switching during a feeding voltage phase produces thus a current in the shape of a saw-tooth constituted by the sections a, b, c, d, as illustrated in FIG. 3, said current varying thus between the limit values I1 and I2. These two limit values which define the average motor current through their own average value may be adjusted in a very simple manner through the two resistances R1 and R2 as shown in FIG. 1.

When the motor has reached a predetermined speed, the voltage induced by the rotation of the rotor is superimposed over the voltage O at the point C.

Consequently, the commutation voltage is reduced while simultaneously the induced voltage of opposite polarity rises. Therefore, the slope of the rising curent curve sections shown at g and i in FIG. 3 decreases, whereas simultaneously the slope of the sinking or falling current curve sections shown at h and k in FIG. 3 increases. The corresponding voltage curve is illustrated by the voltage levels g, h, i and k in FIG. 2. When the speed of rotation corresponding to equilibrium has been obtained and there is no overloading of the motor, the current reaches no longer the value I2 and the above-described sequence of operation of phase sections ceases. On the other band, a suitable selection of the current values I1, I2 or of the threshold values of the voltage across the resistance R corresponding to the values of the current allows stabilising the speed of rotation of the motor at any desired value below the speed of rotation corresponding to equilibrium. Under such conditions of operation, the motor operates permanently under the control of successive phase modifications, whereby the changes in phase may be controlled themselves through an auxiliary adjusting circuit governed by the speed of the motor.

Figure 4:
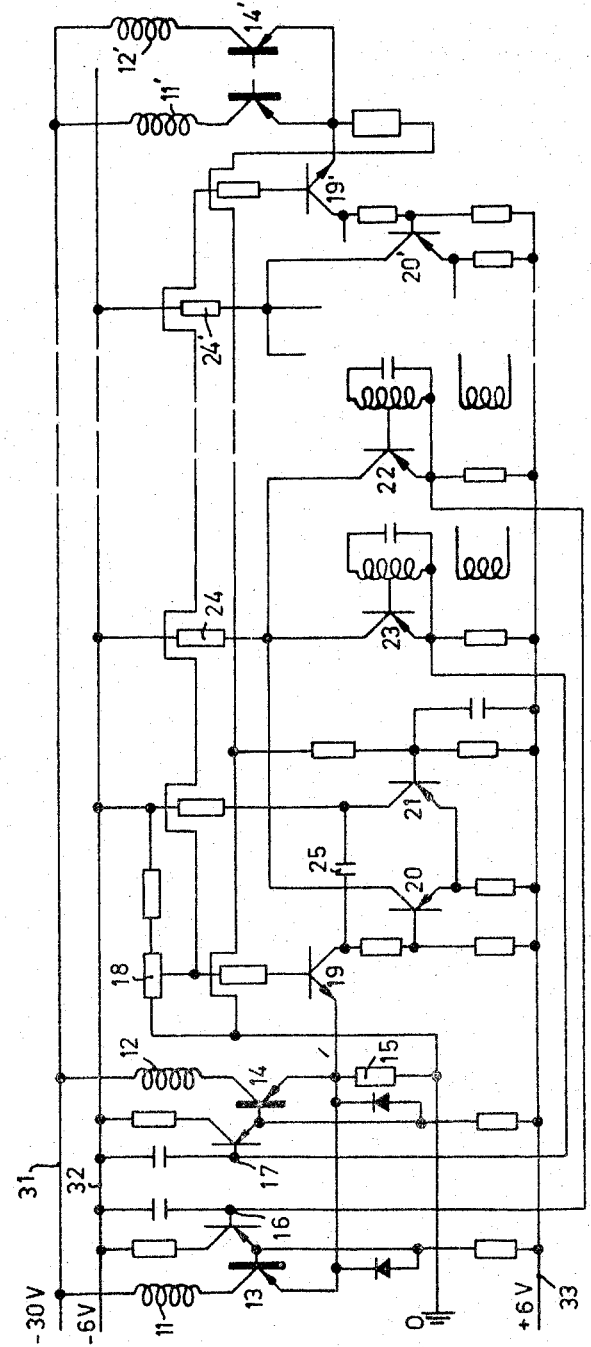
FIG. 4 is a wiring diagram of a second embodiment.

In the second embodiment of a wiring diagram according to the invention, as illustrated in FIG. 4, a main supply of voltage serves for energizing the two driving windings 11, 12 and two auxiliary voltage supplies energize the electronic control system. "O" designates the ground 31 the negative terminal of the main voltage supply which may supply, for instance, —30 volts, while 32 designates the negative terminal of the auxiliary supply which may supply —6 volts and 33 designates the positive terminal of the auxiliary voltage supply supplying +6 volts.

The two motor driving windings 11 and 12 are connected with the same phase and are energized alternatingly through the two power transistors 13 and 14. The power transistors are energized by the detector transistors 22 and 23 through the preliminary amplifiers constituted by the transistors 16 and 17. Each of the detectors 22 and 23 illustrated in the embodiment as a transistor system is associated with an oscillating circuit of which the coupling with an energizing oscillator, which is not illustrated, is adjusted in a conventional manner by a screening disc rigid with the motor rotor so as to depend on the position of the rotor. For instance, the oscillating circuit is energized and consequently the transistor 22 or 23 is shifted into its conductive condition only when the uncoupling provided normally by the screening disc is brought to an end upon registry of a corresponding notch in the disc with the detector.

In all cases, when the detector 22 or 23 is energized, the power transistor 13 or 14 is set in its conductive condition through the preliminary transistors 16 and 17. The phase section is defined during the energizating period of one of the two detectors by the transistor 20 which is normally in an inoperative non conductive condition and the collector terminal of which is connected through the resistance 24 common to the collector circuits of the two detectors with the negative potential equal to —6 volts. The transistor 20 is on the other controlled through the n-p-n transistor 19 by the voltage across the resistance 15. The resistance 15 is inserted in the operative circuit of the winding 12. The base of the transistor 19 can be subjected to a preliminary negative voltage through the agency of the potentiometer 18, so that the threshold value of the voltage across the resistance 15 may be adjustable, the voltage when rising above the threshold value returns the transistor 19 and consequently the transistor 20 to their conductive condition. A reaction circuit of which the transistor 21, which is conductive when inoperative forms a part, still further accelerates the shifting of the condition of the transistor 20. The conductive condition of the transistor 20 results in that the collector voltage for the detector transistors 22 and 23 breaks down and consequently the detectors are rendered inoperative. Thus the power transistor 13 or 14 which is then in a conductive condition becomes non conductive and consequently the corresponding current can no longer flow through the driving winding 11 or 12.

The time during which the transistor 20 is in a conductive condition and consequently the duration of the break in the energization of the driving means 11 or 12 depends substantially on the value of the capacity of the condenser 25. By suitably selecting this capacity, it is possible to define for instance the intervals during the operation in phase sections down to a few $10^{-4}$ seconds and after this time has elapsed, the transistor 20 is again suddenly brought into its non-conductive condition and the corresponding driving winding is again energized. The following interruption is produced when the motor current rises again above the threshold value providing for the operation of the transistor 19. Thus, it is possible to obtain a saw-toothed shape for the current, the curve of which is similar in principle to the curve illustrated in FIG. 3.

In contradistinction with the first embodiment, the phase section control system which includes chiefly the transistors 19, 20, 21, is common for the two operative circuits of the power transistors 13 and 14 and it acts correspondingly together on both detectors 22 and 23. When the motor carries a two-phase winding or when it is provided with two stators shifted with reference to each other so as to ensure for instance an automatic starting which cuts out any idle areas for the rotor, it is possible to provide a phase section control fully similar to that described for the second phase. Only the potentiometer 18 provided for the adjustment of the threshold voltage is to be selected in this case in common for the two phase section control systems.

A second phase section control for a second motor phase is illustrated by way of example in FIG. 4 by the elements 11', 12', 13', 14', 19', 20', 24', which correspond exactly to the elements which carry the similar reference numbers without the prime.

In order to absorb the induced voltages arising during the successive phase sections, it is an advantage to wind the two windings 11 and 12 in a manner such that they may show very high coefficients of mutual induction. Thus, the induced voltage arising during the cutting out of one winding may be absorbed by the other winding. To further this arrangement, the power transistors 13 and 14 are designed in a manner such that, for instance, during the cutting out of the transistor 13 a negative induced voltage arises on its collector, while the collector of the transistors 14 provides a positive potential. The collector voltage on the transistor 14 can however not be substantially positive with reference to its base and to its emitter without the transistor becomming conductive, which furthers the above-mentioned absorption.

It is often of considerable advantage to control the power stages of a motor through electronic commutation by means of a transformer which, on the one hand, ensures the matching of the impedances and, on the other hand, allows a galvanic separation between the operative potentials at the input and at the output ends. The transformer has however the drawback that it cannot ensure a constant coupling, whereby the starting of motors coupled in such a manner can be detrimentally affected when the braking torque is too high to allow a very speedy acceleration.

Now the phase section control system according to the invention provides means for eliminating the above-mentioned drawback and even during the inoperative condition of the motor it is possible to obtain A.C. coupling.

Figure 5:
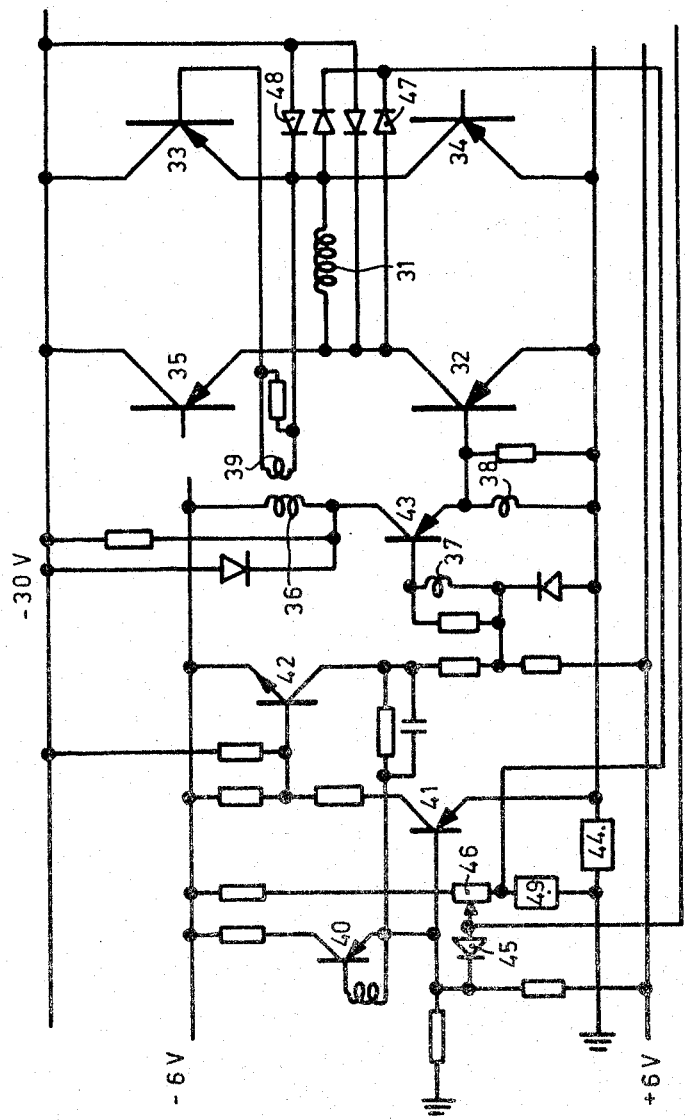
FIG. 5 is a wiring diagram of a third embodiment.

Such a coupling, through a transformer for power stages, is illustrated in the wiring diagram according to FIG. 5. In the wiring diagram, the energizing winding 31 of a motor phase is inserted in the diagonal wire of a bridge formed by four power transistors 32–35 and which is connected with the D.C. mains the voltage of which is equal in the case illustrated to 30 v. In fact the emitters of the power transistors 32 and 34 are grounded and the collectors of the other power transistors 33, 35 are connected with the 30 v. voltage. The power transistors 32 to 35 thus form the control elements for the commutation of the energizing current.

The energizing winding 31 of the motor is energized during each half-cycle of the corresponding motor phase. During one half cycle, the two diagonally opposed power transistors 32–33 are conductive, whereas during the other half cycle the other power transistors 34, 35 are conductive. The two power transistors of the bridge which are not conductive at one time are locked. The direction of the current flowing through the energizing winding 31 is thus reversed between successive half cycles.

The matching and coupling transformer is constituted by a locking oscillating circuit including the primary winding 36, the reaction winding 37, the winding 38 providing a coupling for the power transistor 32 and the winding 39 for the coupling of the other power transistor 33.

In the wiring diagram considered, illustrated in FIG. 5, only the control means for the two power transistors 32 and 33 are illustrated; in other words, only those control means which are operative during one of the two half cycles. The control means for the two other power transistors 34 and 35 operating during the other half cycle are executed in an entirely similar manner.

The control element or detector 40 is subjected to the action of the control member not illustrated, revolving in unison with the motor shaft, each time the rotor of the motor which is not illustrated, passes through a predetermined angular position. The detector, including a transistor and also a winding inserted in the base circuit of the transistor, is energized for instance during the energizing phases defined by the control member carried by the rotor through the agency of an oscillator, whereas, outside such energizing phases, the control member consisting of a screening disc provides for the uncoupling of the winding of the detector 40 with reference to the oscillator.

The transistor incorporated with the oscillator 40 is thus non-conductive when in its inoperative condition, while it is conductive during the energizing phase. The detector 40 controls a monostable multivibrator to which the two complementary auxiliary transistors 41 and 42 belong. The monostable multivibrator is of the well-known Schmidt trigger type. The two transistors 41 and 42 are non-conductive in their inoperative condition and during the operative stages they are conductive as will be disclosed hereinafter.

The monostable multivibrator controls the transistor 43 which forms the active element of the above mentioned locking oscillating circuit. In the base circuit of the transistor 43 is inserted the above mentioned reaction winding 37 and in its emitter circuit is inserted the winding 38 for the coupling of the power transistor 32.

The complete control system including the above-mentioned four transistors 40 to 43 is energized by an auxiliary voltage supply the terminals of which, as illustrated, are +6 volts, ground, —6 volts.

As long as the detector 40 is not energized, the four above mentioned transistors 40 to 43 and therewith the two power transistors 32 and 33 remain in their locked condition. When in contradistinction, the detector 40 is energized during one half cycle, the detector transistor becomes conductive and this results in that also the transistors 41 and 42 of the monostable multivibrator and also the transistor 43 and consequently the two power transistors 32 and 33 become conductive whereby the energizing winding 31 of the motor is also energized with current.

This current applied to the motor flows through the resistance 44 inserted in the emitter circuit of the power transistor 32. The drop in voltage across the resistance 44 allows controlling the succession of phase sections. When the energizing current which may, in this case, be constituted as well by the braking current, rises above a predetermined threshold value and therewith the voltage across the resistance 44 rises beyond a limit value, the monostable multivibrator is switched back, by reason of the blocking of the transistor 41, into its non-conductive condition which leads to a blocking of the transistor 43 and consequently of the two power transistors 32 and 33. This limit value of the voltage for which the power transistors 32 and 33 are cut out is defined by the diode 45 and also by the adjustment of the potentiometer 46.

The induced voltage in the energizing winding 31, as obtained upon cutting off of the energizing current is limited by the diodes 47 and 48. The current flowing then through the diode 47 is led in accordance with the wiring diagram of FIG. 5 through the resistance 49 so that the voltage across the resistance 49 keeps the transistor 41 in its non-conductive condition as long as the current flowing through the resistance 49 is under a predetermined value. This value below which the transistor 41 and consequently the monostable multivibrator are returned into their conductive condition is defined chiefly by the actual resistance 49.

The condition for the transistor 41 and all the following transistors to be returned into their conductive condition is that the detector must be energized as above and that consequently the member controlling the detector 40 remains still in an angular position corresponding to the energizing phase. In such a case, the energizing winding 31 is energized again as long as the motor current has not risen up to its maximum predetermined value after which the renewed cutting out of the power transistors 32 and 33 is obtained. This play between the phase sections is repeated as long as the detector 40 is energized.

In an exactly similar manner, the two other power transistors 34 and 35 are controlled during their energizing phase in their other half period, while the detector 40 and therewith the power transistors 32 and 33 are non-conductive.

Figure 6:
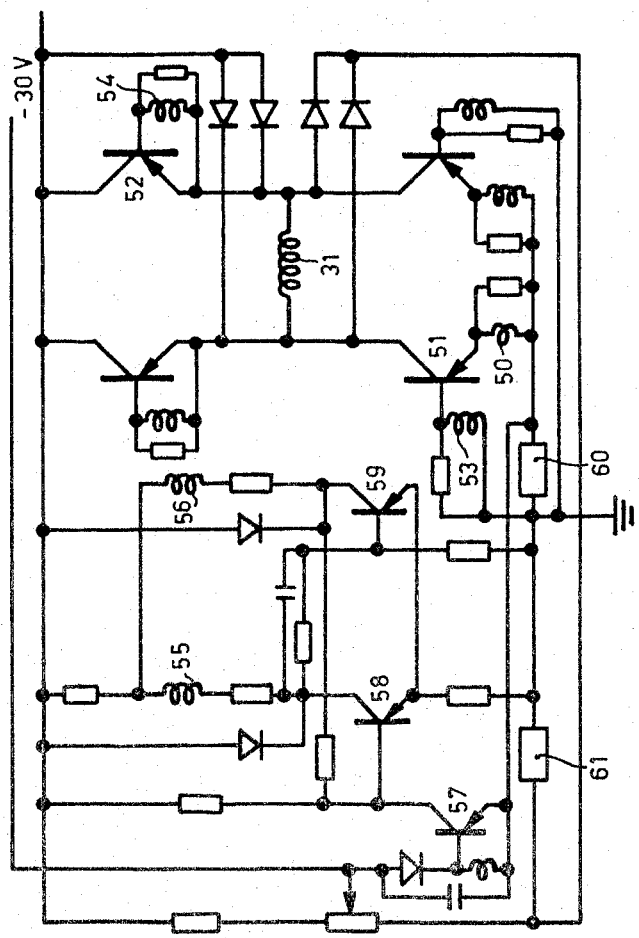
FIG. 6 is a wiring diagram of a fourth embodiment.

FIG. 6 shows a further embodiment of such a control system operating with a transformer. In contradistinction with the precedingly described embodiment, the diagram according to FIG. 6 requires no auxiliary voltage and is energized with the voltage from the mains.

The energizing winding 31 of the motor is inserted again in a bridge connection constituted by four power transistors, while as precedingly only two diametrically opposed power transistors 51 and 52 need be considered, which latter are operated during one half cycle. In the wiring diagram, the blocking oscillating circuit forming the coupling transformer is energized through the actual D.C. mains voltage, again under 30 volts. To this end, the primary winding 50 of the coupling transformer is inserted in the emitter circuit of the power transistor 51. The reacting winding 53 is again inserted in the base circuit of the power transistor 51, while the secondary winding 54 is inserted in the base circuit of the power transistor 52 for energizing the latter. The windings 55 and 56 of the same transformer are in such a case in the collector circuit of the two transistors 58 and 59 which form again a monostable multivibrator of the well known so called Schmidt trigger type.

This monostable multivibrator is controlled by the detector transistor 57. As long as the detector is not energized and the transistor 57 remains thus in its blocked condition, all the above-mentioned transistors with the exeception of the transistor 58 of the monostable multivibrator are blocked. At the moment at which the detector 57 becomes energized, the transistor 58 is shifted into its blocked condition, while the other transistor 59 associated with the monostable multivibrator becomes conductive. The voltage thus induced in the corresponding transformer through the modifications in the intensity of the current in the windings 55 and 56 sets the power transistors 51 and 52 in a conductive condition, whereby the blocking oscillator is released as a consequence of the operation of the reaction or feedback winding 53.

The cutting off of the energizing current when it rises above a predetermined limit value is defined in the case considered by the resistance 60 in the emitter circuit of the power transistor 51. When the voltage across the resistance rises beyond a predetermined threshold value, the detector transistor 57 becomes non-conductive, which leads to a triggering of the monostable multivibrator and consequently to a blocking of the coupling transformer by the voltages induced through the triggering in the windings 55 and 56. In the embodiment illustrated in FIG. 6, the minimum intensity of current below which the monostable multivibrator returns the power discriminators 51 and 52 back into their conductive condition is defined by the resistance 61.

In the described embodiment given by way of example, the actual detector transistor 57 is thus controlled by the energizing current and controls the sequence of phase sections as described hereinabove.

The control of the sequence of phase sections according to the invention allows keeping in a simple manner the current intensity in the motor below a predetermined limit value with a view to protecting the semi-conductive elements in particular during the starting and during the braking and the adjustment of the above-mentioned threshold voltages and intensities allows also adjusting the speed of the motor to a predetermined value. Furthermore, an advantage is obtained which consists in that it is possible to feed the system with a constant D.C. voltage, which provides a considerable simplification of the rectifying system and furthermore allows energizing and deenergizing the motor through the sole agency of currents of a very reduced intensity feeding the detectors 7 and 8 (FIG. 1) or 22 and 23 in the case of FIG. 4 or again 30 (FIG. 5) or 57 (FIG. 6).

In the wiring diagram according to FIG. 1 the diodes 9 and 10 provide also a recovery of the inductive energy, whereby an excellent efficiency is obtained for all normal condition of operation.

Through reversal of the polarity of the switching means, it is possible furthermore to brake the motor electrically in a very simple manner. With such a counter-current braking, the phase section operation according to the invention may be applied in a similar manner for the limitation of the braking current so that it is possible to make the motors provided with the connections according to the invention serve for the most various conditions of operation in a highly efficient manner.

The invention is not limited to the embodiments illustrated and, in fact, the principle underlying the invention can be applied to a large number of modifications.

For instance it is possible to replace the blocking oscillator according to FIGS. 5 and 6 by a normally not energized oscillator of a different type, which is energized through the voltage across the resistance R (FIG. 1) or else it is possible to resort to an oscillator associated with a magnetically saturable circuit which is saturated by the adjustable maximum motor current intensity.

Lastly, the sequence of successive phase sections can be controlled also by a multivibrator of which the frequency or period of operation is a function of the current or of the speed of rotation of the motor.

What I claim is:

1. A control circuit for a D.C. powered A.C. motor having a stator winding and a power circuit comprising:
   (1) a monostable multivibrator connected with said control circuit;
   (2) power transistors connected to said stator winding for energizing the same in both current directions;
   (3) at least two voltage-control producing means connected in the base circuit of said power transistors and with said monostable multivibrator, one of said means acting on one of said power transistors during one current direction and the other controlling said other power transistor for the other current direction;
   (4) switching means controlled by the motor current for making said power transistor non-conductive whenever a given maximum value of the motor current is exceeded, and for making it again conductive whenever the motor current falls below a given value;
   (5) an auxiliary circuit having an operative member connected to said switching means for adjusting the threshold value of the voltage of the switching means as a function of the speed of rotation of the motor.

2. The circuit of claim 1 wherein said switching means consist of said monostable multivibrator acting directly on said control voltage producing means to turn them on and off.

3. The circuit of claim 1, wherein said control voltage producing means functions additionally as switching means.

4. The circuit of claim 1, having in said power circuit a first resistance, the voltage drop of which controls the switching means for making said power transistors non-conductive and a second resistance which is only passed by the induction current of said motor and the voltage drop across which renders said power transistors conductive.

5. The circuit of claim 1, having a condenser connected to said switching means holding the one said power transistor in the non-conductive state, the discharge time of said condenser determinging the time said switching means retain the transistor in the non-conductive state.

6. A control circuit for a D.C. operated A.C. motor having a power circuit comprising:
   (1) a driving winding for said motor;
   (2) at least two power transistors connected to said winding for energizing the same in both current directions, each transistor being at a different potential, each transistor being controlled by a monostable multivibrator;
   (3) a transformer coupled inductively by its secondary winding with the base circuit of said transistor at the higher potential, the primary winding of said transformer being in the output circuit of said monostable multivibrator connected therewith;
   (4) two voltage control-producing means controlling both said monostable multivibrator;

(5) switching means controlled by the motor current for making said power transistors non-conductive whenever a given maximum value of the motor current is exceeded and making said transistor conductive whenever its motor current falls below a minimum value;

(6) a blocking oscillating circuit controlled by said monostable multivibrator, acting on the transistor at the higher potential the primary winding of said transformer forming a part of said oscillating circuit;

(7) an auxiliary circuit having an operative member connected to said switching means for adjusting the threshold value of the voltage of said switching means as a function of the speed of rotation of said motor.

7. The control circuit of claim 6, having four diametrically opposed power transistors connected in a bridge in the middle of which is located said motor winding so that the diametrically opposed transistors are simultaneously switched on and off and one transistor of each pair is at a lower potential than the other, the transistor of each diagonal pair being the lower potential and connected to the output of the blocking oscillator circuit while the other transistor of the higher potential is coupled inductively by means of said transformer, said transformer having a secondary winding in the base circuit of said transistor at the lower potential for accelerating the switching characteristics thereof:

8. The control circuit of claim 7 wherein said transistor at the lower potential is the transistor of the blocking oscillating circuit and the primary winding of said transformer is in the emitter circuit of said transistor and the feedback winding of the oscillator is in the base circuit of said transistor.

9. The control circuit of claim 7 wherein said transformer has an additional winding arranged in said output circuit of said monostable multivibrator.

10. The circuit of claim 7 wherein said switch means consist of said monostabe multivibrator itself and the threshold voltage value thereof is variable according to the speed of rotation of a control member.

11. The circuit of claim 7, wherein said switch means consist of said voltage control-producing means itself, the threshold voltage value being varied by a control member as a function of said auxiliary circuit.

References Cited by the Examiner
UNITED STATES PATENTS

| | | | |
|---|---|---|---|
| 2,814,769 | 11/1957 | Williams | 318—138 X |
| 2,995,690 | 8/1961 | Lemon | 318—138 |
| 3,170,105 | 2/1965 | Muldoon | 318—341 |

ORIS L. RADER, *Primary Examiner.*

S. GORDON, G. SIMMONS, *Assistant Examiners.*